Jan. 29, 1952  L. E. NELSON  2,583,792
TIMER CIRCUIT
Filed May 22, 1948

Inventor:
Lloyd E. Nelson,
By Dawson, Ooms, Booth and Spangenberg,
Attorneys.

Patented Jan. 29, 1952

2,583,792

UNITED STATES PATENT OFFICE 2,583,792

TIMER CIRCUIT

Lloyd E. Nelson, Evanston, Ill.

Application May 22, 1948, Serial No. 28,701

8 Claims. (Cl. 250—27)

1

This invention is directed to timer circuits.

The principal object of this invention is to provide an improved timer circuit for periodically operating a load device, wherein the periodicity of operation of the load device may be adjusted to substantially any desired frequency, wherein the dwell of operation of the load device may be adjusted to substantially any desired value, wherein the periodicity and dwell of operation of the load device remains at fixed values regardless of voltage source fluctuations, wherein the timer circuit may be readily and inexpensively manufactured, and wherein the timer circuit is readily adapted to many timing applications or uses.

Basically, the timer circuit includes two electronic valves, a relay and a load device, the relay being included in the plate circuit of one electronic valve and the load device being included in the plate circuit of the other electronic valve. The relay controls the grids of both electronic valves to render them non-conductive when the relay is momentarily energized. A resistance capacity network is associated with each grid of the electronic valves to permit the electronic valves to conduct after a time interval following de-energization of the relay. In this way the load device is operated at fixed periodicity and dwell. The time constants of the resistance capacity networks may be independently adjusted for independently adjusting the periodicity and dwell of operation of the load device.

Figure 1:
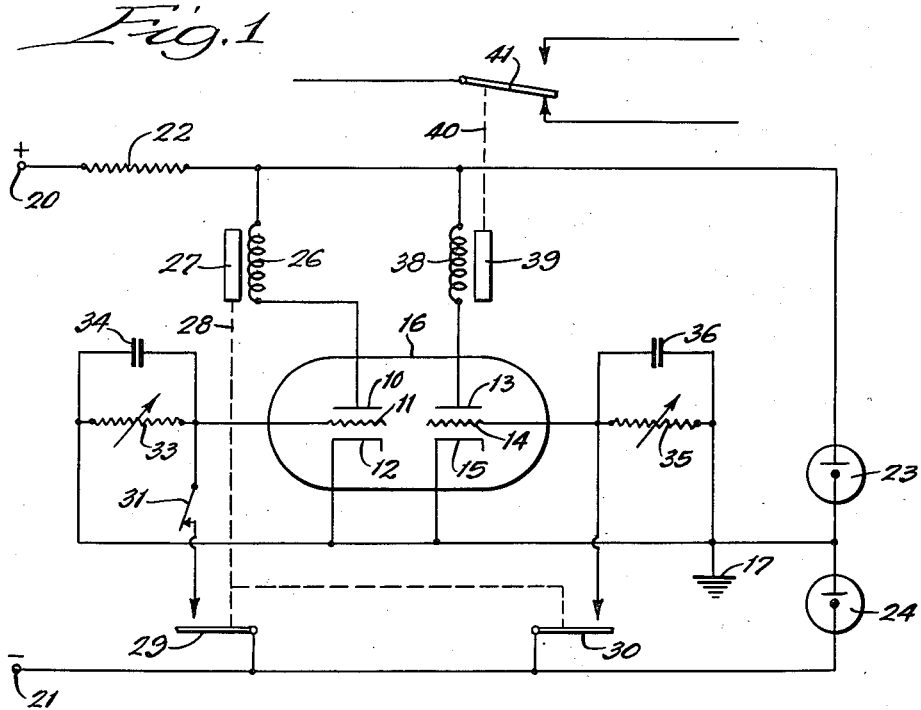
Figure 2:
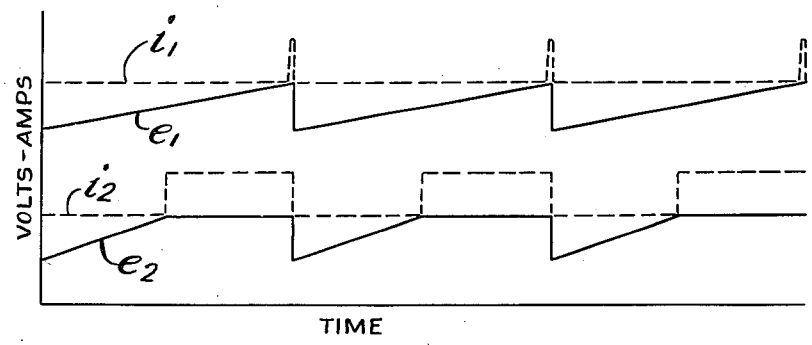

Further objects of this invention will become apparent to those skilled in the art upon reference to the accompanying specification, claims and drawing in which:

Figure 1 is a schematic wiring diagram illustrating the timer circuit of this invention; and Figure 2 is a chart plotting grid voltage and plate current of the two electronic valves against time.

Referring to Figure 1, the timer circuit includes a first electronic valve having a plate 10, grid 11 and a cathode 12, and a second electronic valve having a plate 13, a grid 14 and a cathode 15. Both electronic valves may, if desired, be included in a single bottle 16 to form a double tube such as a 6SN7. The cathodes 12 and 15 are connected together and grounded as at 17.

Electrical power is supplied to the timer circuit at terminals 20 and 21 in the form of a D. C. voltage placed thereacross. The terminal 20 is the positive terminal, while the terminal 21 is the negative terminal. Preferably the D. C. voltage so applied is at least 380 volts. The positive terminal 20 is connected through a resistor 22 and through series connected voltage regulator tubes 23 and 24 to the negative terminal 21. The voltage regulator tubes may be of conventional construction, as for example VR 150 tubes. The junction between the voltage regulator tubes 23 and 24 is connected to ground at 17. The resistance 22 has, for example, a value of 4,000 ohms, 5 watt capacity and cooperates with the voltage regulator tubes to maintain a constant voltage of 300 volts across the voltage regulator tubes regardless of fluctuations in the applied D. C. voltage. Since the junction between the voltage regulator tubes 23 and 24 is grounded the apparent voltage across the circuit is plus 150 volts and minus 150 volts.

A relay is included in the plate circuit of the first tube and may comprise an operating coil 26 and an armature 27 mechanically connected at 28 to a pair of switches 29 and 30. When the operating coil 26 is energized the switches 29 and 30 are closed, and when it is de-energized, they are open. The switch 29 connects the grid 11 of the first electronic valve through a manual switch 31 to the negative terminal 21 so that when the switch 29 is closed the grid 11 is driven negatively to minus 150 volts whereby the first electronic valve is rendered non-conductive. Likewise the switch 30 connects the grid 14 of the second electronic valve to the negative terminal 21 so that when the switch 30 is closed the grid 14 is driven negatively to minus 150 volts.

A resistance capacity network including a variable resistance 33 and a parallel connected condenser 34 also connects the grid 11 of the first electronic valve to ground 17. Likewise a resistance capacity network including a variable resistance 35 and a parallel connected condenser 36 connects the grid 14 of the second electronic valve to ground 17.

The plate circuit of the second electronic valve includes a load device to be operated thereby and the load device may comprise an operating coil 38 and an armature 39 mechanically connected at 40 to a switch 41.

When the relay included in the plate circuit of the first electronic valve is energized the switches 29 and 30 are closed whereby the grids 11 and 14 are driven negatively to minus 150 volts and the condensers 34 and 36 are correspondingly negatively charged. As a result the first and second electronic valves are rendered non-conducting. The relay is then immediately de-energized whereupon the switches 29 and 30 open. The negative charge on the condenser 34 thereupon leaks off through variable resistance 33 to ground 17 gradually to increase the voltage on the grid 11. When the grid voltage rises to a pre-determined value the first electronic valve then becomes conductive whereupon the relay is again energized to repeat the cycle. The periodicity of the energization of the relay in the plate circuit of the first electronic valve is determined by the value of the variable resistance 33. The greater the resistance, the slower the periodicity, and vice versa, the lesser the resistance the faster the periodicity. The variable resistance 33 may be readily manually adjusted for pre-determining the periodicity of the operation of the relay.

When the switch 30 of the relay of the plate circuit of the first electronic valve is closed momentarily as pointed out above to drive the grid 14 of the second electronic valve to minus 150 volts the condenser 36 is correspondingly negatively charged. When the switch 30 is opened the negative charge on the condenser 36 thereupon leaks off through variable resistance 35 to ground 17 gradually to increase the voltage of the grid 14. When the grid voltage rises to a pre-determined value, the second electronic valve then becomes conductive to energize the operating coil 38 of the load device in the plate circuit of the second electronic valve. The load device remains energized until the switch 30 is again momentarily closed to drive the grid 14 of the second electronic valve to minus 150 volts. The interval of time of energization of the load device, that is, the dwell of operation thereof, is determined by the value of the variable resistance 35, the greater the resistance the lesser the dwell and vice versa, the lesser the resistance the greater the dwell. The variable resistance 35 may be readily manually adjusted for pre-determining the dwell of operation of the load device.

Since the operation of the second electronic valve and the load device is also dependent upon the operation of the relay associated with the first electronic valve, the load device is periodically operated in accordance with the operation of the first electronic valve. Thus, the frequency or periodicity of operation of the load device is regulated by the variable resistance 33 associated with the first electronic valve and the dwell of operation of the load device is regulated by the variable resistance 35 associated with the second electronic valve.

In operation, the time constant of the resistance capacity network of the second electronic valve is less than the time constant of the resistance capacity network of the first electronic valve and the differences between these time constants are related to the dwell of operation of the load device.

In Figure 2 curve $e_1$ represents the grid voltage of the first electronic valve while the curve $i_1$ represents the plate current thereof. It will be seen that the plate current rises sufficiently to energize the relay at fixed periodical intervals, the time between the periodical energization of the relay being determined by the value of the variable resistance 33. In Figure 2, the curve $e_2$ represents the grid voltage of the second electronic valve and the curve $i_2$ represents the plate current thereof. At the same intervals of time the load device is energized upon the increase in plate current and the dwell of such energization is determined by the point in the cycle when the grid voltage $e_2$ increases to the conducting value. This point may be varied by adjusting the value of the variable resistance 35.

For example, the resistance of the operating coils 26 and 38 may be 10,000 ohms, the capacity of the condenser 34 may be three microfarads. The capacity of the condenser 36 may be two microfarads and the variable resistances 33 and 35 may be five megohms resistance. Preferably, the variable resistances may be adjusted through a range of from 50,000 ohms to 5 megohms. With these various values the periodicity of operation of the load device may be varied from one second to one minute the relay device may be varied between one-tenth second and one-half minute.

The switch 41 of the load device may be utilized for controlling any external circuit for any desired use wherein variable timing in accordance with this invention is desired. The load device in lieu of being in the form of a relay as illustrated may take any other form for providing timing operations.

The timer circuit as described above will operate continuously so long as D. C. voltage is applied thereto. Any desired means may be utilized for interrupting the operation of the timer circuit such as the manually operated switch 31.

While for purposes of illustration one form of this invention has been disclosed, other forms thereof may become apparent to those skilled in the art upon reference to this disclosure, and therefore, this invention is to be limited only by the scope of the appended claims.

I claim as my invention:

1. A timer circuit comprising a first electronic valve having a plate circuit and a grid circuit, a second electronic valve having a plate circuit and a grid circuit, a relay included in the plate circuit of the first electronic valve and including a pair of switches operated thereby, a resistance capacity network and one of the switches of the relay included in the grid circuit of the first electronic valve, a resistance capacity network and the other switch of the relay included in the grid circuit of the second electronic valve and a load device independent of the plate circuit of the first electronic valve and included in the plate circuit of the second electronic valve and operated thereby.

2. A timer circuit comprising a first electronic valve having a plate circuit and a grid circuit, a second electronic valve having a plate circuit and a grid circuit, a relay included in the plate circuit of the first electronic valve and including a pair of switches which are closed when the electronic valve conducts, one of the switches of the relay being associated with the grid circuit of the first electronic valve for applying a cut-off voltage to the grid thereof to render the same non-conducting when the switch is closed, a resistance capacity network included in the grid circuit of the first electronic valve for gradually increasing the grid voltage thereof to permit the same to conduct after a time interval following opening of said switch of the relay, the other of the switches of the relay being associated with the grid circuit of the second electronic valve for applying a cut-off voltage to the grid thereof to render the same non-conducting when the switch is closed, a resistance capacity network included in the grid circuit of the second electronic valve for gradually increasing the grid voltage thereof to permit the same to conduct after a time interval following opening of said other switch of the relay, and a load device included in the plate circuit of the second electronic valve and operated thereby.

3. A timer circuit comprising a first electronic valve having a plate circuit and a grid circuit, a second electronic valve having a plate circuit and a grid circuit, a relay included in the plate circuit of the first electronic valve and including a pair of switches which are closed when the electronic valve conducts, a source of negative potential, one of the switches of the relay being associated with the grid circuit of the first electronic valve for connecting the grid thereof to the source of negative potential when the switch is closed to render the first electronic valve non-conducting, a resistance capacity network included in the grid circuit of the first electronic valve to cause the grid voltage gradually to increase and to cause the first electronic valve to conduct after a time interval following opening of said switch of the relay, the other of the switches of the relay being associated with the grid circuit of the second electronic valve for connecting the grid thereof to the source of negative potential when the switch is closed to render the second electronic valve non-conducting, a resistance capacity network included in the grid circuit of the second electronic valve to cause the grid voltage gradually to increase and to cause the second electronic valve to conduct after a time interval following opening of said other switch of the relay, and a load device included in the plate circuit of the second electronic valve and operated thereby.

4. A timer circuit comprising a first electronic valve having a plate circuit and a grid circuit, a second electronic valve having a plate circuit and a grid circuit, a relay included in the plate circuit of the first electronic valve and including a pair of switches operated thereby, a resistance capacity network and one of the switches of the relay included in the grid circuit of the first electronic valve, a resistance capacity network and the other switch of the relay included in the grid circuit of the second electronic valve, a load device independent of the plate circuit of the first electronic valve and included in the plate circuit of the second electronic valve and operated thereby, means for adjusting the time constant of the resistance-capacity network of the first electronic valve to adjust the periodicity of operation of the load device, and means for adjusting the time constant of the resistance-capacity network of the second electronic valve to adjust the dwell of operation of the load device.

5. A timer circuit comprising a first electronic valve having a plate circuit and a grid circuit, a second electronic valve having a plate circuit and a grid circuit, a relay included in the plate circuit of the first electronic valve and including a pair of switches which are closed when the electronic valve conducts, one of the switches of the relay being associated with the grid circuit of the first electronic valve for applying a cut-off voltage to the grid thereof to render the same non-conducting when the switch is closed, a resistance capacity network included in the grid circuit of the first electronic valve for gradually increasing the grid voltage thereof to permit the same to conduct after a time interval following opening of said switch of the relay, the other of the switches of the relay being associated with the grid circuit of the second electronic valve for applying a cut-off voltage to the grid thereof to render the same non-conducting when the switch is closed, a resistance capacity network included in the grid circuit of the second electronic valve for gradually increasing the grid voltage thereof to permit the same to conduct after a time interval following opening of said other switch of the relay, a load device included in the plate circuit of the second electronic valve and operated thereby, means for adjusting the time constant of the resistance capacity network of the first electronic valve to adjust the periodicity of operation of the load device, and means for adjusting the time constant of the resistance capacity network of the second electronic valve to adjust the dwell of operation of the load device.

6. A timer circuit comprising a first electronic valve having a plate circuit and a grid circuit, a second electronic valve having a plate circuit and a grid circuit, a relay included in the plate circuit of the first electronic valve and including a pair of switches which are closed when the electronic valve conducts, a source of negative potential, one of the switches of the relay being associated with the grid circuit of the first electronic valve for connecting the grid thereof to the source of negative potential when the switch is closed to render the first electronic valve non-conducting, a resistance capacity network included in the grid circuit of the first electronic valve to cause the grid voltage gradually to increase and to cause the first electronic valve to conduct after a time interval following opening of said switch of the relay, the other of the switches of the relay being associated with the grid circuit of the second electronic valve for connecting the grid thereof to the source of negative potential when the switch is closed to render the second electronic valve non-conducting, a resistance capacity network included in the grid circuit of the second electronic valve to cause the grid voltage gradually to increase and to cause the second electronic valve to conduct after a time interval following opening of said other switch of the relay, a load device included in the plate circuit of the second electronic valve and operated thereby, means for adjusting the time constant of the resistance capacity network of the first electronic valve to adjust the periodicity of operation of the load device, and means for adjusting the time constant of the resistance capacity network of the second electronic valve to adjust the dwell of the operation of the load device.

7. A timer circuit comprising a first electronic valve having a plate grid and cathode, a second electronic valve having a plate, grid and cathode, a plate circuit for the first electronic valve including a relay having a pair of switches which are closed when the electronic valve conducts, a grid circuit for the first electronic valve including a resistance capacity network connecting the grid and cathode thereof, a source of negative potential, one of the switches of the relay adapted to connect the source of negative potential to the grid of the first electronic valve when the switch is closed, a grid circuit for the second electronic valve including a resistance capacity network connecting the grid and cathode thereof, the other of the switches of the relay adapted to connect the source of negative potential to the grid of the second electronic valve when the switch is closed, and a plate circuit for the second electronic valve including a load device to be operated thereby.

8. A timer circuit comprising a first electronic valve having a plate grid and cathode, a second electronic valve having a plate, grid and cathode, a plate circuit for the first electronic valve including a relay having a pair of switches which are closed when the electronic valve conducts, a grid circuit for the first electronic valve including a resistance capacity network connecting the grid and cathode thereof, a source of negative potential, one of the switches of the relay adapted to connect the source of negative potential to the grid of the first electronic valve when the switch is closed, a grid circuit for the second electronic valve including a resistance capacity network connecting the grid and cathode thereof, the other of the switches of the relay adapted to connect the source of negative potential to the grid of the second electronic valve when the switch is closed, a plate circuit for the second electronic valve including a load device to be operated thereby, and means for independently adjusting the time constants of the two resistance capacity networks.

LLOYD E. NELSON.

REFERENCES CITED

The following references are of record in the file of this patent:

UNITED STATES PATENTS

| Number | Name | Date |
|---|---|---|
| 2,306,237 | Wolfner | Dec. 22, 1942 |
| 2,379,262 | Terry | June 26, 1945 |
| 2,387,293 | Preston | Oct. 23, 1945 |

FOREIGN PATENTS

| Number | Country | Date |
|---|---|---|
| 528,132 | Great Britain | Oct. 23, 1940 |